United States Patent
Ohtsuka (10) Patent No.: US 9,651,436 B2
(45) Date of Patent: May 16, 2017

(54) INTERFEROMETRIC OPTICAL FIBER SENSOR SYSTEM AND INTERFEROMETRIC OPTICAL FIBER SENSOR HEAD

(71) Applicant: Sumitomo Electric Industries, Ltd., Osaka-shi (JP)

(72) Inventor: Takafumi Ohtsuka, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 14/844,894

(22) Filed: Sep. 3, 2015

(65) Prior Publication Data

US 2016/0061672 A1 Mar. 3, 2016

(30) Foreign Application Priority Data

Sep. 3, 2014 (JP) .................................. 2014-178956
Jun. 9, 2015 (JP) .................................. 2015-116314

(51) Int. Cl.
G01L 1/24 (2006.01)
G01B 11/16 (2006.01)
G01B 9/02 (2006.01)
G01D 5/353 (2006.01)

(52) U.S. Cl.
CPC ............... *G01L 1/242* (2013.01); *G01B 9/02* (2013.01); *G01B 11/162* (2013.01); *G01D 5/35303* (2013.01)

(58) Field of Classification Search
CPC ........ G01B 11/162; G01B 9/02; G01B 11/18; G01L 1/24; G01L 1/241

USPC ......................................................... 356/35.5
See application file for complete search history.

(56) References Cited

U.S. PATENT DOCUMENTS

| 2004/0141420 A1* | 7/2004 | Hardage | .................. E21B 47/00 367/149 |
| 2009/0103100 A1* | 4/2009 | Froggatt | ............. G01M 11/3172 356/477 |
| 2010/0134787 A1* | 6/2010 | Kim | ...................... G01M 11/331 356/73.1 |
| 2013/0011093 A1* | 1/2013 | Goh | ........................ G02F 1/0121 385/3 |

(Continued)

FOREIGN PATENT DOCUMENTS

JP 2005-241298 A 9/2005
JP 2013-174563 A 9/2013

*Primary Examiner* — Tarifur Chowdhury
*Assistant Examiner* — Md M Rahman
(74) *Attorney, Agent, or Firm* — Venable LLP; Michael A. Sartori; Laura G. Remus (57) ABSTRACT

An interferometric optical fiber sensor system comprises a light source, a first coupler optically connected to the light source, a first optical path for inputting measurement light, a second optical path for inputting reference light, a second coupler for combining the first and second optical paths together, a photodetector for measuring modulation of the measurement light and the reference light, and a coil for modulating with a stress exerted thereon the measurement light and the reference light. The first optical path has an optical length equal to that of the second optical path. The first optical path has a first delay line, while the second optical path has a second delay line. The coil is disposed between the first delay line and the second coupler and between the second delay line and the first coupler.

9 Claims, 7 Drawing Sheets (56) References Cited

U.S. PATENT DOCUMENTS

2014/0185125 A1* 7/2014 Kanter .................... G02F 1/21
 359/279

* cited by examiner

INTERFEROMETRIC OPTICAL FIBER SENSOR SYSTEM AND INTERFEROMETRIC OPTICAL FIBER SENSOR HEAD

BACKGROUND OF THE INVENTION

1. Field of the Invention

The present invention relates to an interferometric optical fiber sensor system and an interferometric optical fiber sensor head.

2. Related Background Arts

Japanese Patent Application Laid-Open No. 2005-241298 discloses an interferometric optical fiber sensor comprising a sensing arm and a reference arm. The sensing arm and the reference arm are provided with temperature-compensating fibers for suppressing temperature drifts. Japanese Patent Application Laid-Open No. 2013-174563 discloses an interferometric optical fiber sensor in which delay fibers are inserted in front of and behind a sensor unit. This interferometric optical fiber sensor splits light with a coupler and imparts a delay to one of the split parts of light. The coupler recombines the other part of light with the delayed part of light. The interferometric optical fiber sensor inputs thus recombined light to the sensor.

SUMMARY OF THE INVENTION

The interferometric optical fiber sensor disclosed in Japanese Patent Application Laid-Open No. 2005-241298 uses a special fiber as the temperature-compensating fibers, which may increase the cost of manufacture and so forth. The interferometric optical fiber sensor disclosed in Japanese Patent Application Laid-Open No. 2013-174563 comprises a plurality of components for splitting light, imparting a delay, and combining light. They complicate its structure. Interferometric optical fiber sensors such as those mentioned above are desired to be less susceptible to external environments in order to be able to measure modulation of measurement light and reference light securely.

The interferometric optical fiber sensor system in accordance with one aspect of the present invention comprises a light source; a first coupler optically connected to the light source; a first optical path, optically connected to the first coupler, for inputting one of measurement light and reference light split from the first coupler; a second optical path, optically connected to the first coupler, for inputting the other of the measurement light and the reference light; a second coupler for combining the first and second optical paths together, a measurement unit for measuring modulation of the measurement light and the reference light according to light combined by the second coupler; and a modulation unit for modulating with a stress exerted thereon the measurement light and the reference light. The first optical path has a first delay line, while the second optical path has a second delay line. The first optical path has an optical length equal to that of the second optical path. The modulation unit is disposed between the first delay line and the second coupler and between the second delay line and the first coupler.

The interferometric optical fiber sensor head in accordance with one aspect of the present invention comprises a first optical path for inputting one of measurement light and reference light; a second optical path for inputting the other of the measurement light and the reference light; and a coil wound with the first and second optical paths. The first optical path has a first delay line located closer to an input end than is the coil, while the second optical path has a second delay line located closer to an output end than is the coil. The first optical path has an optical length equal to that of the second optical path.

DESCRIPTION OF EMBODIMENTS

First, contents of embodiments of the present invention will be listed and explained. (1) The interferometric optical fiber sensor system in accordance with one aspect of the present invention comprises a light source; a first coupler optically connected to the light source; a first optical path, optically connected to the first coupler, for inputting one of measurement light and reference light split from the first coupler, a second optical path, optically connected to the first coupler, for inputting the other of the measurement light and the reference light; a second coupler for combining the first and second optical paths together; a measurement unit for measuring modulation of the measurement light and reference light according to light combined by the second coupler; and a modulation unit for modulating with a stress exerted thereon the measurement light and the reference light. The first optical path has a first delay line, while the second optical path has a second delay line. The first optical path has an optical length equal to that of the second optical path. The modulation unit is disposed between the first delay line and the second coupler and between the second delay line and the first coupler.

The interferometric optical fiber sensor system in accordance with one aspect of the present invention sets phases of measurement light and reference light in order by having the first and second delay lines. Upon receiving a stress, the modulation unit modulates the measurement light and the reference light. One of the modulated measurement light and reference light is inputted to the second delay line, so as to be delayed from the other. Therefore, the measurement unit can extract the measurement light and the reference light selectively. This enables a simple structure to reduce environmental influences, whereby the measurement unit can measure modulation of the measurement light and the reference light securely.

(2) In the interferometric optical fiber sensor system, the modulation unit may be a coil including the first and second optical paths wound about a common core. This can place the first and second optical paths in the modulation unit under the same environment. Therefore, the measurement unit can measure modulation of the measurement light and the reference light in a state where environmental influences are reduced.

(3) In the interferometric optical fiber sensor system, a delay time caused by the first delay line and a delay time caused by the second delay line may be equal to each other. This enables a simple structure to set phases of the measurement light and the reference light in order.

(4) In the interferometric optical fiber sensor system, the measurement unit may remove a ghost signal outputted from the second delay line. This can eliminate an unnecessary signal and raise the measurement accuracy.

(5) In the interferometric optical fiber sensor system, the first and second couplers may be in common, the first and second optical paths may be in common, and the first and second delay lines may be in common. This can place the optical paths under the same environment, thereby making them less susceptible to external environments. Using the optical paths in common can easily achieve a structure which makes optical lengths coincide with each other, thereby readily raising the detection sensitivity.

(6) In the interferometric optical fiber sensor system, the first and second optical paths may be wound about a core with a gap therebetween, while each of a delay time caused by the first delay line and a delay time caused by the second delay line may be longer than a time required for the stress to propagate through the gap. This can make the time by which the stress propagates through the gap less influential to the delay time caused by each delay line. Therefore, by making the delay time relatively long, the measurement unit can extract modulation of the measurement light and the reference light more securely.

(7) In the interferometric optical fiber sensor system, the stress may propagate as an acoustic wave.

(8) The interferometric optical fiber sensor system may comprise a multicore fiber including a first core constituting at least a part of the first optical path and a second core constituting at least a part of the second optical path. This can simplify the structure.

(9) The interferometric optical fiber sensor system may comprise a first single-core fiber optically connected to one end of the first core of the multicore fiber, a second single-core fiber optically connected to one end of the second core of the multicore fiber, a third single-core fiber optically connected to the other end of the first core of the multicore fiber, and a fourth single-core fiber optically connected to the other end of the second core of the multicore fiber, the first single-core fiber having the first delay line, the fourth single-core fiber having the second delay line.

(10) The interferometric optical fiber sensor head in accordance with one aspect of the present invention comprises a first optical path for inputting one of measurement light and reference light, a second optical path for inputting the other of the measurement light and the reference light, and a coil wound with the first and second optical paths. The first optical path has a first delay line located closer to an input end than is the coil, while the second optical path has a second delay line located closer to an output end than is the coil. The first optical path has an optical length equal to that of the second optical path. When a stress is exerted on the coil, the measurement light and the reference light are modulated in this interferometric optical fiber sensor head. Then, one of the modulated measurement light and reference light is inputted to the second delay line, so as to be delayed from the other. Therefore, the measurement light and the reference light can be extracted selectively, whereby effects similar to those of the above-mentioned interferometric optical fiber sensor system can be obtained.

(11) In the interferometric optical fiber sensor head, a delay time caused by the first delay line and a delay time caused by the second delay line may be equal to each other. This can simplify structures of the first and second delay lines as mentioned above.

(12) In the interferometric optical fiber sensor head, the first and second optical paths may be wound about a core of the coil with a gap therebetween, while each of the delay time caused by the first delay line and the delay time caused by the second delay line may be longer than a time required for the stress to propagate through the gap in the coil. This enables the measurement unit to extract the measurement light and the reference light more securely as mentioned above.

(13) In the interferometric optical fiber sensor head, the first and second optical paths may be in common, and the first and second delay lines may be in common. This can place the optical paths under the same environment, thereby making them less susceptible to external environments. Using the optical paths in common can easily achieve a structure which makes optical lengths coincide with each other, thereby readily raising the detection sensitivity.

Specific examples of the interferometric optical fiber sensor system and interferometric optical fiber sensor head in accordance with embodiments of the present invention will be explained with reference to the drawings. The present invention is not limited to these illustrations, but intends to be defined by the claims and include all the modifications within the scope equivalent to the claims. In the following explanations of the drawings, the same constituents will be referred to with the same signs while omitting their overlapping descriptions.

First Embodiment

Figure 1:
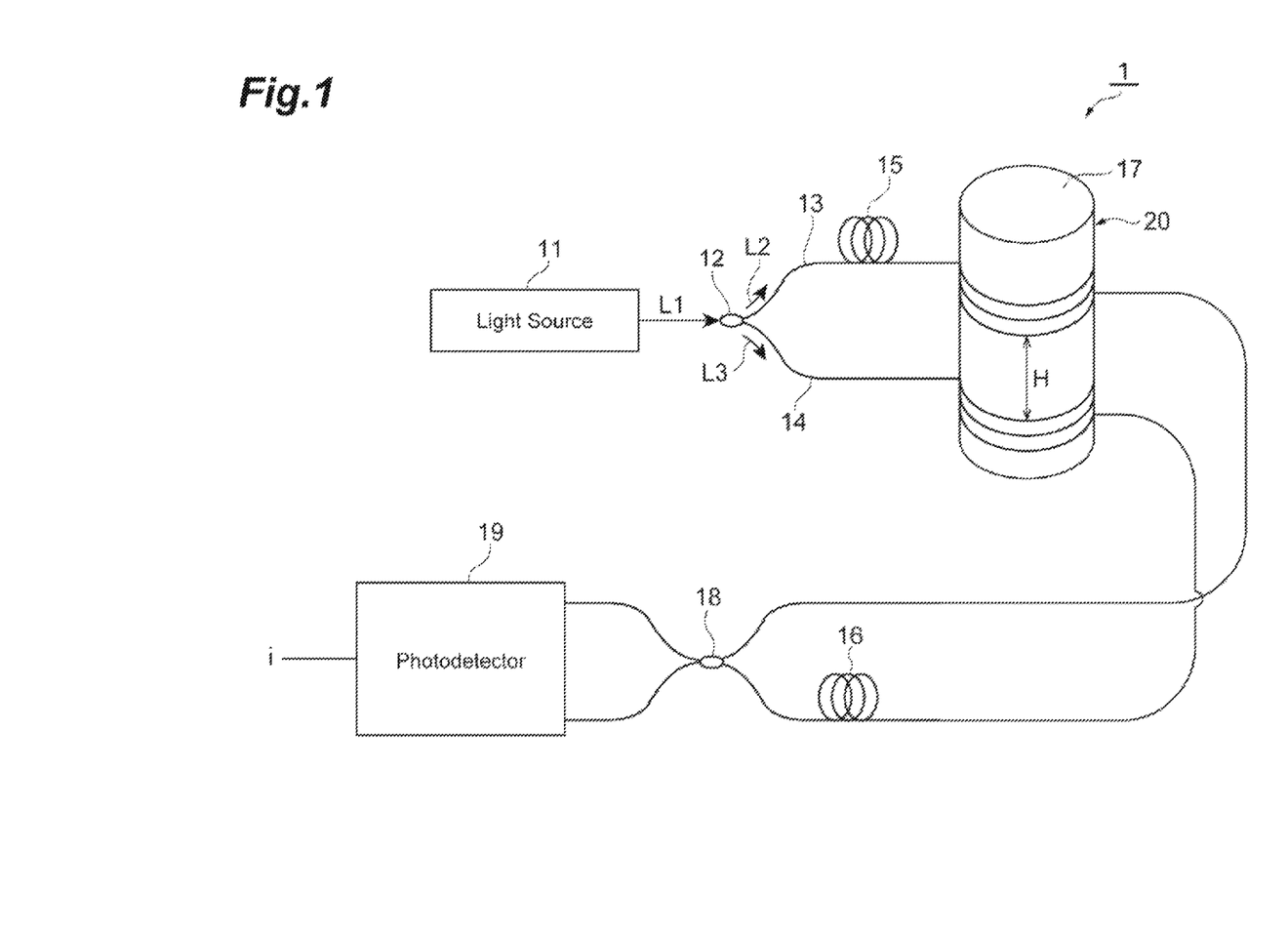
FIG. 1 is a diagram illustrating the interferometric optical fiber sensor system in accordance with a first embodiment.

FIG. 1 illustrates the structure of an interferometric optical fiber sensor system 1 in accordance with the first embodiment. As illustrated in FIG. 1, the interferometric optical fiber sensor system 1 comprises a light source 11, a first coupler 12, a first optical path 13, a second optical path 14, a second coupler 18, a photodetector 19, and a coil 20.

The light source 11 outputs signal light L1 which is pulsed light. The light source 11 is optically connected to the first coupler 12. The signal light L1 outputted from the light source 11 is inputted to the first coupler 12. The first coupler 12 splits the signal light L1 from the light source 11 into measurement light L2, which is pulsed light, and reference light L3, which is pulsed light, and then outputs them.

The first optical path 13 is optically connected to the first coupler 12. One end of the first optical path 13 is connected to the first coupler 12, while the other end of the first optical path 13 is connected to the second coupler 18. The first optical path 13 inputs to one end thereof the measurement light L2 outputted from the first coupler 12 and guides it. A first delay line 15 and the coil 20 are disposed in the middle of the first optical path 13.

Like the first optical path 13, the second optical path 14 is optically connected to the first coupler 12. One end of the second optical path 14 is connected to the first coupler 12, while the other end of the second optical path 14 is connected to the second coupler 18. The second optical path 14 inputs to one end thereof the reference light L3 outputted from the first coupler 12 and guides it. The coil 20 and a second delay line 16 are disposed in the middle of the second optical path 14. An example of the first and second optical paths 13, 14 is an optical fiber. The optical length of the first optical path 13 is equal to that of the second optical path 14. For example, the first and second optical paths 13, 14 are made of the same material.

The first delay line 15 is arranged on the input end side of the coil 20. The first delay line 15 imparts a delay to the measurement light L2 inputted to the first optical path 13. The delayed measurement light L2 is outputted to the second coupler 18 through the coil 20. The second delay line 16 is arranged on the output end side of the coil 20. The second delay line 16 imparts a delay to the reference light L3 inputted to the second optical path 14 and then passed through the coil 20. The delayed reference light L3 is outputted to the second coupler 18. For example, the delay time imparted by the second delay line 16 is equal to the delay time imparted by the first delay line 15.

The coil 20 has a core 17 about which the first and second optical paths 13, 14 are wound helically. For example, the first optical path 13 is wound about the core 17 by the same length and number of turns as with the second optical path 14 wound about the core 17. The coil 20 receives a vibration or the like from the outside, whereby a stress is exerted thereon. The stress in the coil 20 propagates as an acoustic wave over the coil 20. The core 17 is wound with the first and second optical paths 13, 14 separated from each other by a gap H. That is, the distance between the first and second optical paths 13, 14 on the core 17 is the gap H. The time required for the stress to propagate through the gap H in the coil 20 is shorter than each of the respective delay times caused by the first and second delay lines 15, 16. While FIG. 1 illustrates only one coil 20, two or more coils 20 may be provided.

The second coupler 18 combines the first and second optical paths 13, 14 together. The second coupler 18 combines the measurement light L2 having passed through the first optical path 13 and the reference light L3 having passed through the second optical path 14 together. The second coupler 18 is optically connected to the photodetector 19. The light combined by the second coupler 18 is outputted to the photodetector 19.

According to the light combined by the second coupler 18, the photodetector 19 detects modulation of the measurement light L2 and reference light L3. Interference light of the measurement light L2 and reference light L3 is inputted to the photodetector 19. The photodetector 19 detects the interference light and performs homodyne detection. In a state where no stress is generated in the coil 20, the measurement light L2 delayed by the first delay line 15 and the reference light L3 delayed by the second delay line 16 are inputted to the second coupler 18 at the same time. Therefore, the photodetector 19 measures interference light of the delayed measurement light L2 and delayed reference light L3.

Figure 2:
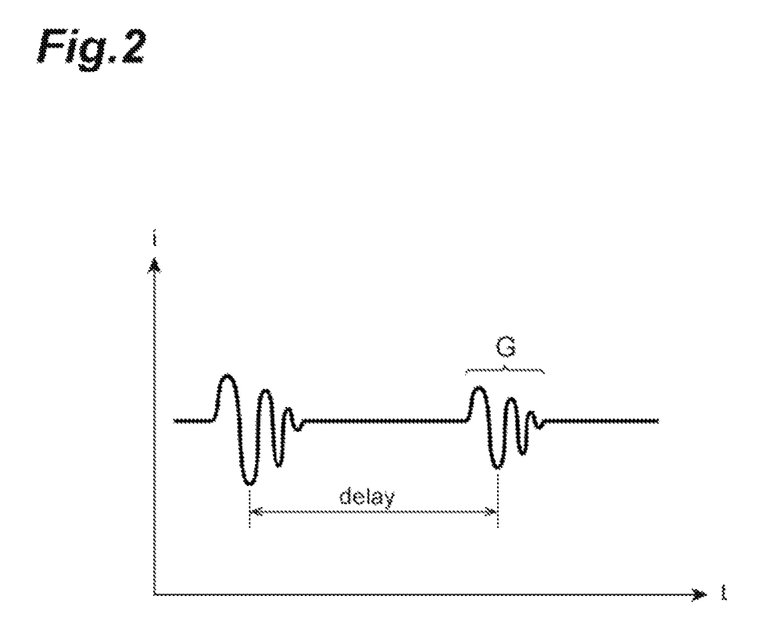
FIG. 2 is a graph illustrating an example of waveforms of signals detected by a photodetector.

On the other hand, when a stress is generated in the coil 20, the stress causes phase modulation in the measurement light L2 and reference light L3 in the coil 20. In the phase-modulated measurement light L2 and reference light L3, only the reference light L3 passes through the second delay line 16. Therefore, a phase difference occurs between the measurement light L2 and reference light L3 inputted to the second coupler 18. Then, the measurement light L2 and reference light L3 having a waveform illustrated in the graph of FIG. 2 are inputted to the photodetector 19, for example.

By detecting such measurement light L2 and reference light L3 in the photodetector 19, the interferometric optical fiber sensor system 1 detects that the stress is exerted on the coil 20. The photodetector 19 removes a ghost signal G concerning the reference light L3 outputted from the second delay line 16. By the ghost signal G is meant an optical signal inputted with a delay to the photodetector 19 through the second delay line 16 when the stress is exerted on the coil 20.

Effects obtained by thus constructed interferometric optical fiber sensor system 1 in accordance with this embodiment will now be explained.

By having the first and second delay lines 15, 16, the interferometric optical fiber sensor system 1 sets phases of the measurement light L2 and reference light L3 in order. Upon receiving a stress, the coil 20 modulates the measurement light L2 and reference light L3. The modulated reference light L3 is inputted to the second delay line 16 and delayed from the measurement light L2. Therefore, the photodetector 19 can extract the measurement light L2 and reference light L3 selectively. This enables a simple structure to reduce environmental influences, whereby the measurement unit 19 can measure modulation of the measurement light L2 and reference light L3 securely.

In the coil 20, the first and second optical paths 13, 14 are wound about the common core 17. This can place the first and second optical paths 13, 14 in the coil 20 under the same environment. Therefore, the photodetector 19 can measure the measurement light L2 and reference light L3 in a state where environmental influences are reduced.

The delay time caused by the first delay line 15 and the delay time caused by the second delay line 16 are equal to each other. This enables a simple structure to set phases of the measurement light L2 and reference light L3 in order.

The photodetector 19 removes the ghost signal outputted from the second delay line 16. This can eliminate an unnecessary signal and raise the measurement accuracy.

The first and second optical paths 13, 14 are wound about the core 17 with the gap H therebetween. Each of the respective delay times caused by the first and second delay lines 15, 16 is longer than the time required for the stress to propagate through the gap H. This can make the time by which the stress propagates through the gap H less influential to the delay time caused by each delay line 15, 16. By making the delay time thus relatively long, the photodetector 19 can extract modulation of the measurement light L2 and reference light L3 more securely.

Second Embodiment

Figure 3:
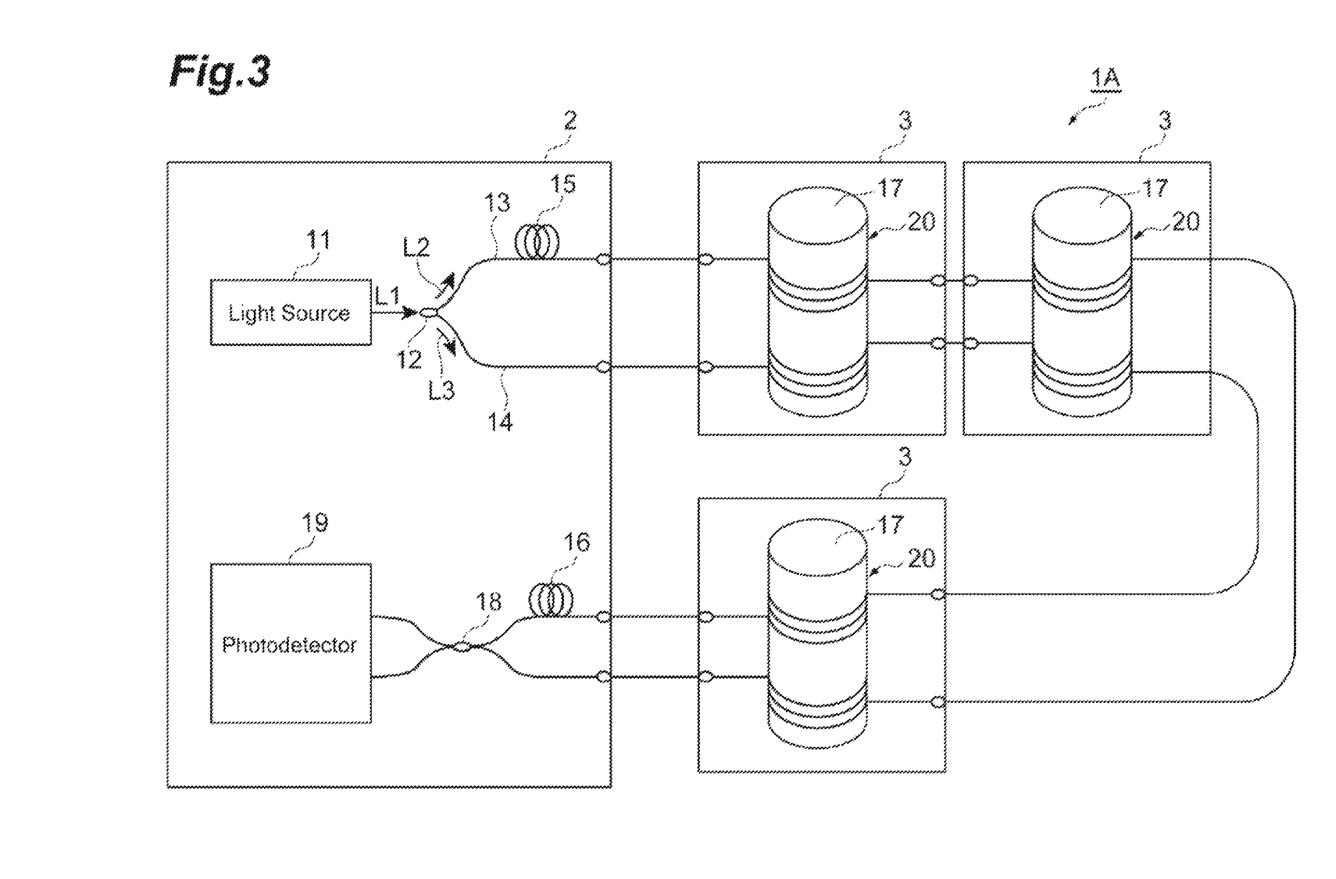
FIG. 3 is a diagram illustrating the interferometric optical fiber sensor system in accordance with a second embodiment.

FIG. 3 illustrates the structure of an interferometric optical fiber sensor system 1A in accordance with the second embodiment. The explanation of the second embodiment omits descriptions overlapping with the first embodiment. The third to fifth embodiments, which will be explained later, also omit the overlapping descriptions. As illustrated in FIG. 3, the interferometric optical fiber sensor system 1A comprises a main unit 2 and three interferometric optical fiber sensor heads 3. The number of interferometric optical fiber sensor heads 3 is not limited to 3, but may be 1, 2, or 4 or more. The main unit 2 comprises a light source 11, a first coupler 12, a first delay line 15, a second delay line 16, a second coupler 18, and a photodetector 19. Each interferometric optical fiber sensor head 3 is equipped with a coil 20.

In the interferometric optical fiber sensor system 1A, upon receiving a stress, the coil 20 of the interferometric optical fiber sensor head 3 modulates the measurement light L2 and reference light L3. As in the first embodiment, only the modulated reference light L3 is inputted to the second delay line 16, so as to be delayed. Therefore, the photodetector 19 can extract the measurement light L2 and reference light L3 selectively, whereby effects similar to those of the first embodiment can be obtained.

Third Embodiment

Figure 4:
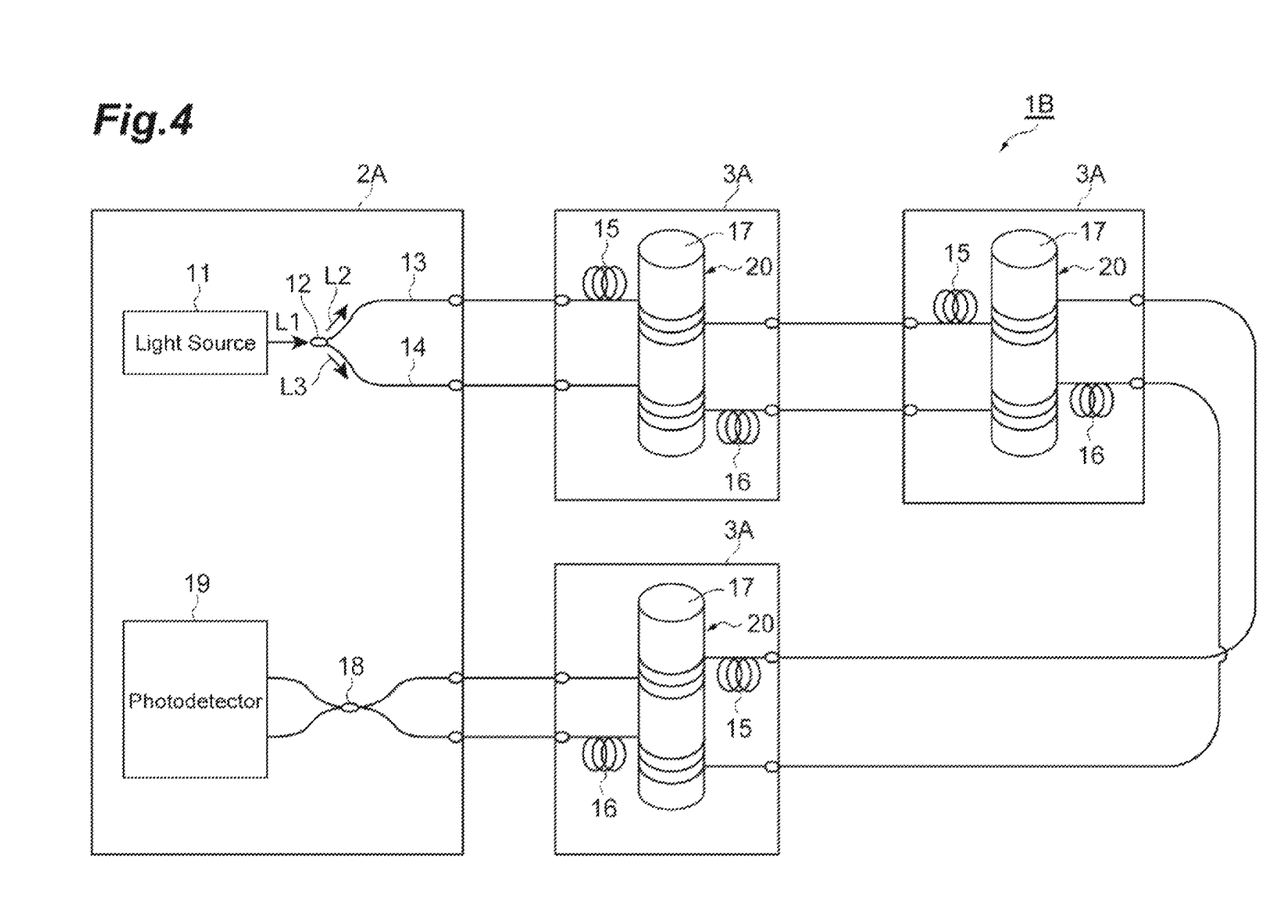
FIG. 4 is a diagram illustrating the interferometric optical fiber sensor system in accordance with a third embodiment.

FIG. 4 illustrates the structure of an interferometric optical fiber sensor system 1B in accordance with the third embodiment. As illustrated in FIG. 4, the interferometric optical fiber sensor system 1B comprises a main unit 2A and three interferometric optical fiber sensor heads 3A. The number of interferometric optical fiber sensor heads 3A is not limited to 3, but may be 1, 2, or 4 or more. The main unit 2A comprises a light source 11, a first coupler 12, a second coupler 18, and a photodetector 19. Each interferometric optical fiber sensor head 3A comprises a first delay line 15, a second delay line 16, and a coil 20.

In the interferometric optical fiber sensor head 3A, upon receiving a stress, the coil 20 modulates the measurement light L2 and reference light L3. Only the modulated reference light L3 is delayed by the second delay line 16. Therefore, the photodetector 19 can extract the measurement light L2 and reference light L3 selectively. As a consequence, the third embodiment can obtain effects similar to those of the interferometric optical fiber sensor systems 1, 1A mentioned above.

Fourth Embodiment

Figure 5:
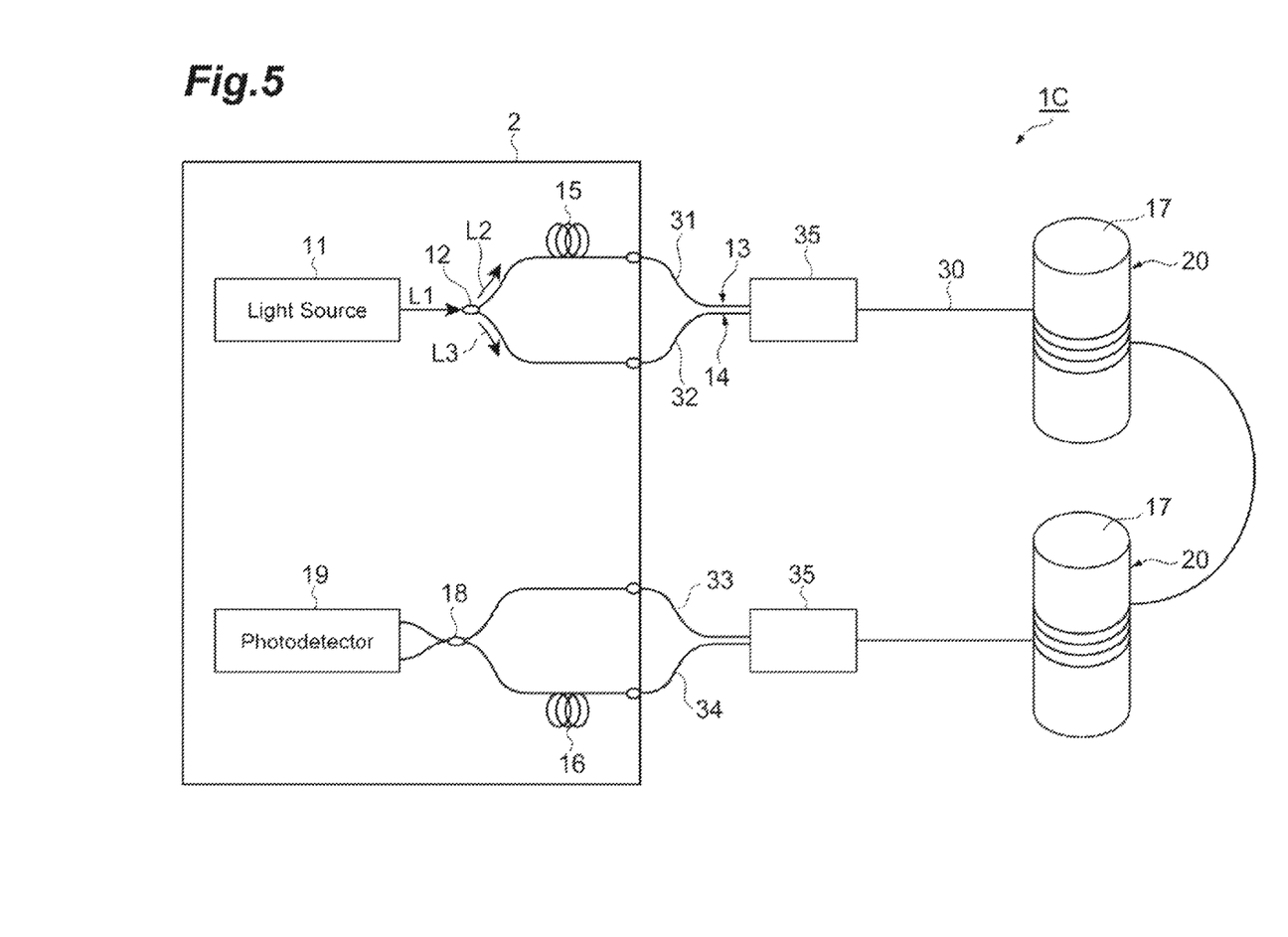
FIG. 5 is a diagram illustrating the interferometric optical fiber sensor system in accordance with a fourth embodiment.
Figure 6:
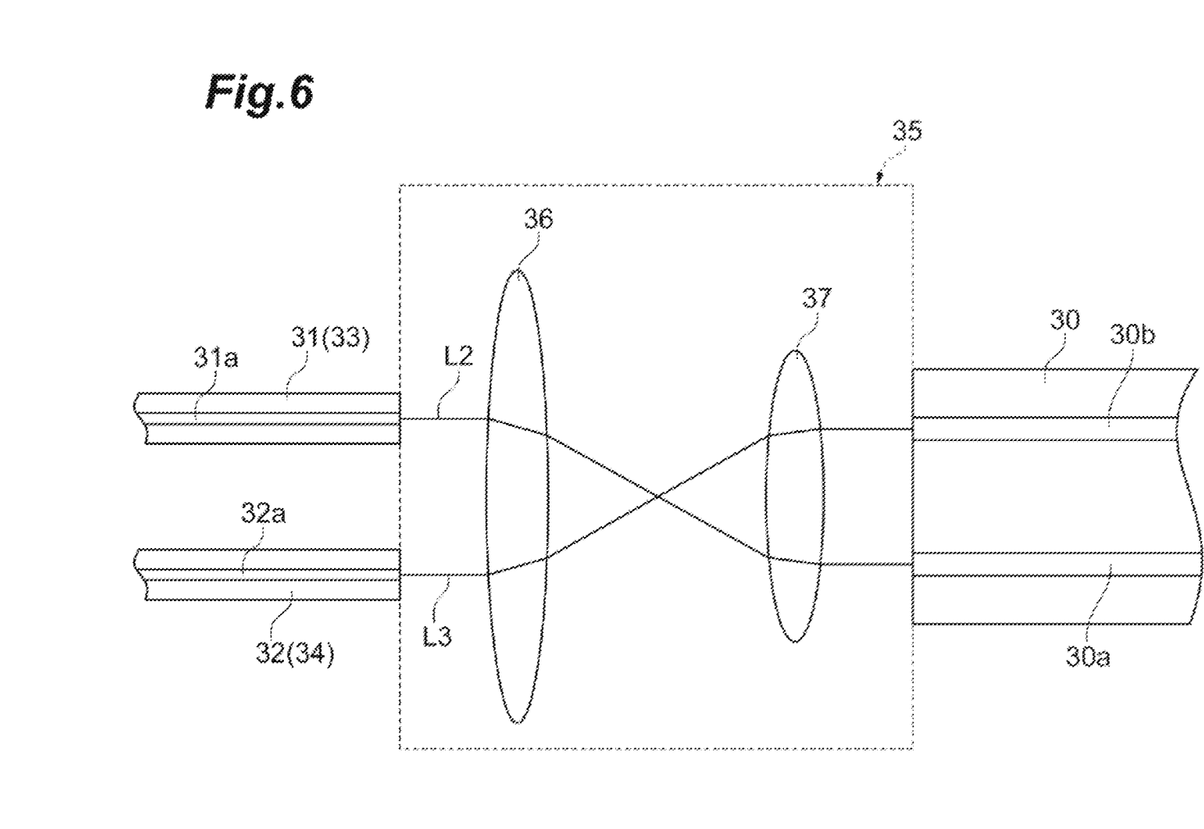
FIG. 6 is a schematic structural diagram illustrating an optical device.

FIGS. 5 and 6 illustrate the structure of an interferometric optical fiber sensor system 1C in accordance with the fourth embodiment. As illustrated in FIGS. 5 and 6, the interferometric optical fiber sensor system 1C comprises a multicore fiber 30, first to fourth single-core fibers 31, 32, 33, 34, and two optical devices 35. The multicore fiber 30 has first and second cores 30a, 30b. In this embodiment, the first optical path 13 includes the first single-core fiber 31, first core 30a, and third single-core fiber 33. The second optical path 14 includes the second single-core fiber 32, second core 30b, and fourth single-core fiber 34.

One end of the first single-core fiber 31 is connected to the first coupler 12, while the other end of the first single-core fiber 31 is connected to the optical device 35. The first delay line 15 is disposed in the middle of the first single-core fiber 31 within the main unit 2. As in the first single-core fiber 31, both ends of the second single-core fiber 32 are connected to the first coupler 12 and optical device 35, respectively. Both ends of the third single-core fiber 33 are connected to the optical device 35 and second coupler 18, respectively. Both ends of the fourth single-core fiber 34 are also connected to the optical device 35 and second coupler 18, respectively.

One end of the multicore fiber 30 is connected to the optical device 35 on the first coupler 12 side, while the other end of the multicore fiber 30 is connected to the optical device 35 on the second coupler 18 side. The multicore fiber 30 is wound about two cores 17. The number of cores 17 (coils 20) may be 1 or 3 or more.

The optical device 35 comprises first and second lenses 36, 37. The second lens 37 is arranged closer to the multicore fiber 30 than is the first lens 36. The optical device 35 on the first coupler 12 side optically combines the multicore fiber 30 with the first and second single-core fibers 31, 32. The first and second single-core fibers 31, 32 have cores 31a, 32a, respectively. An end face of the first single-core fiber 31 emits the measurement light L2, while an end face of the second single-core fiber 32 emits the reference light L3. The optical axes of the measurement light L2 and reference light L3 from the cores 31a, 32a of the first and second single-core fibers 31, 32 are parallel to each other, for example.

The first lens 36 is located on the optical axes of the measurement light L2 and reference light L3 emitted from the cores 31a, 32a of the first and second single-core fibers 31, 32, respectively. The first lens 36 makes the measurement light L2 and reference light L3 have their optical lines nonparallel to each other. The second lens 37 causes the optical axes of the measurement light L2 and reference light L3, which have been made nonparallel to each other by the first lens 36, to become parallel to each other again. The measurement light L2 and reference light L3 made parallel to each other by the second lens 37 enter the first and second cores 30a, 30b, respectively. The optical device 35 thus makes the gap between the optical axes of the measurement light L2 and reference light L3 from the respective cores 31a, 32a of the first and second single-core fibers 31, 32 conform to the gap between the cores 30a, 30b of the multicore fiber 30. The optical device 35 on the second coupler 18 side is constructed as with the optical device 35 on the first coupler 12 side mentioned above and thus will not be explained in detail.

In the interferometric optical fiber sensor system 1C, as mentioned above, the first to fourth single-core fibers 31, 32, 33, 34 are optically connected to one end or the other end of the multicore fiber 30. The first single-core fiber 31 is provided with the first delay line 15, while the fourth single-core fiber 34 is provided with the second delay line 16. Thus using the multicore fiber 30 can simplify the structure of the coil 20.

Fifth Embodiment

Figure 7:
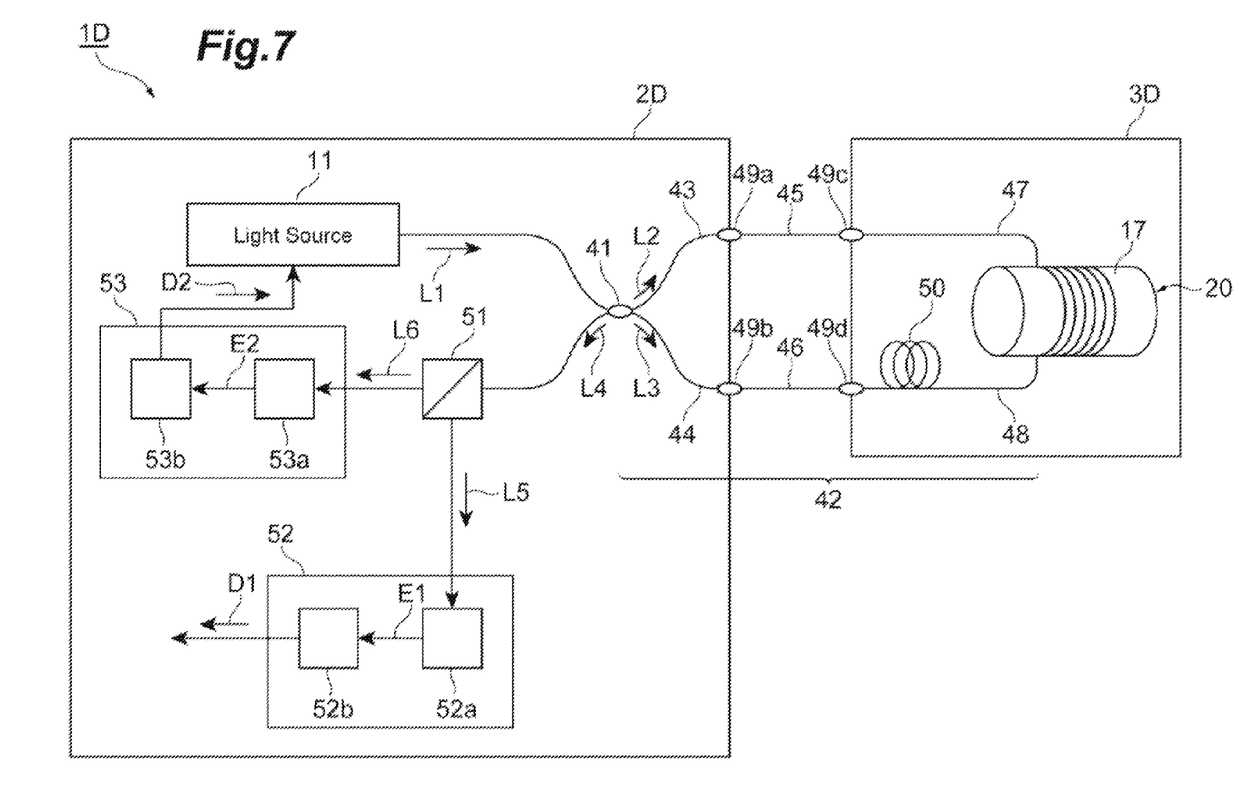
FIG. 7 is a diagram illustrating the interferometric optical fiber sensor system in accordance with a fifth embodiment.

FIG. 7 illustrates the structure of an interferometric optical fiber sensor system 1D in accordance with the fifth embodiment. The interferometric optical fiber sensor system 1D comprises a main unit 2D and an interferometric optical fiber sensor head 3D. The main unit 2D comprises a light source 11, a third coupler 41, a polarization separator 51, a detection unit (measurement unit) 52, and a control unit 53. The interferometric optical fiber sensor head 3D comprises a third delay line 50 and a coil 20.

In the main unit 2D, the light source 11 and third coupler 41 are optically coupled to each other, while the third coupler 41 and polarization separator 51 are optically coupled to each other. The third coupler 41 is connected to a first optical connector 49a through a first subpath 43 and to a second optical connector 49b through a second subpath 44.

In the interferometric optical fiber sensor head 3D, the coil 20 is connected to a third optical connector 49c through a third subpath 47 and to a fourth optical connector 49d through a fourth subpath 48. The coil 20 includes an optical fiber wound about a core 17, while the optical fiber is constituted by the third and fourth subpaths 47, 48 continuous with each other. In this embodiment, the third delay line 50 is provided in the fourth subpath 48. However, the third delay line 50 may be provided in the third subpath 47. The third delay line 50 may also be provided in any of the first, second, fifth, and sixth subpaths 43, 44, 45, 46.

The first and third optical connectors 49a, 49c are connected to each other through the fifth subpath 45, while the second and fourth optical connectors 49b, 49d are connected to each other through the sixth subpath 46. This optically connects the main unit 2D and interferometric optical fiber sensor head 3D to each other. The third optical path 42 is constituted by the first, second, third, fourth, fifth, and sixth subpaths 43, 44, 47, 48, 45, 46. Both ends of the third optical path 42 are optically connected to the third coupler 41.

The signal light L1 outputted from the light source 11 is inputted to the third coupler 41 and outputted as being split into measurement light L2 and reference light L3. The measurement light L2 is inputted to the coil 20 through the first subpath 43, first optical connector 49a, fifth subpath 45, third optical connector 49c, and third subpath 47. Thereafter, the measurement light L2 is outputted to the fourth subpath 48 and travels through the third delay line 50, fourth optical connector 49d, sixth subpath 46, second optical connector 49b, and second subpath 44, so as to be coupled to the third coupler 41 again. Therefore, the measurement light L2 propagates through the third optical path 42 clockwise. That is, the first optical path 13 in the first embodiment corresponds to a path traveling clockwise through the third optical path 42 in this embodiment.

The reference light L3 is inputted to the coil 20 through the second subpath 44, second optical connector 49b, sixth subpath 46, fourth optical connector 49d, third delay line 50, and fourth subpath 48. Thereafter, the reference light L3 is outputted to the third subpath 47 and travels through the third optical connector 49c, fifth subpath 45, first optical connector 49a, and first subpath 43, so as to be coupled to the third coupler 41 again. Therefore, the reference light L3 propagates through the third optical path 42 counterclockwise. That is, the second optical path 14 in the first embodiment corresponds to a path traveling counterclockwise through the third optical path 42 in this embodiment.

The measurement light L2 and reference light L3 are inputted to the third coupler 41, so as to be combined together, whereby interference light L4 is outputted. The interference light L4 is inputted to the polarization separator 51, so as to be outputted as being split into first and second polarization components L5, L6.

The first polarization component L5 is coupled to the detection unit 52. The detection unit 52 receives the first polarization component L5 and generates a detection signal D1 for detecting an acoustic signal in the coil 20. The detection unit 52 comprises a first photodetector 52a and a first processor 52b. The first photodetector 52a converts the optical intensity of the inputted first polarization component L5 into a voltage value, so as to output a first electric signal E1. The first processor 52b generates the detection signal D1 from the first electric signal E1.

The second polarization component L6 is coupled to the control unit 53. The control unit 53 receives the second polarization component L6. The control unit 53 generates a control signal D2 for controlling the light source 11 and inputs the control signal D2 to the light source 11. The control unit 53 comprises a second photodetector 53a and a second processor 53b. The second photodetector 53a converts the intensity of the inputted second polarization component L6 into a voltage value, so as to output a second electric signal E2. The second processor 53b generates the control signal D2 from the second electric signal E2.

The main unit 2D may maximize the optical intensity of the first polarization component L5 in order to improve the sensitivity for detecting the detection signal D1. For this purpose, the control unit 53 may control the polarization state of the signal light L1 emitted from the light source 11 such that the optical intensity of the second polarization component L6 is minimized.

In the interferometric optical fiber sensor head 3D, the reference light L3 passes through the third delay line 50 and then is inputted to the coil 20. Therefore, the measurement light L2 and reference light L3 are inputted to the coil 20 at respective timings different from each other. When a stress is exerted on the coil 20, one of the measurement light L2 and reference light L3 is modulated. The measurement light L2 outputted from the coil passes through the third delay line 50 and then is inputted to the third coupler 41. As a consequence, the measurement light L2 and reference light L3 are inputted to the third coupler 41 at substantially the same timing. This makes it possible to yield the interference light L4 even when both of the measurement light L2 and reference light L3 propagate through the third optical path 42. Therefore, the optical path (third optical path 42) through which the measurement light L2 and reference light L3 propagate in the coil 20 can be placed under the same environment. This makes the detection signal D1 less susceptible to external environments.

In the interferometric optical fiber sensor system 1D and interferometric optical fiber sensor head 3D in accordance with this embodiment, the third coupler 41 is used in common as the first and second coupler 12,18 in the first embodiment. The third optical path 42 is used in common as the first and second optical paths 13, 14, while the third delay line 50 is used in common as the first and second delay lines 15, 16.

The interferometric optical fiber sensor system 1D comprises the light source 11; the third coupler 41 optically connected to the light source 11; the third optical path 42 having both ends connected to the third coupler 41, inputting to one end the measurement light L2 outputted from the third coupler 41, and inputting to the other end the reference light L3 outputted from the third coupler 41; the detection unit 52 for measuring modulation of the measurement light L2 and reference light L3 according to the light combined by the third coupler 41; and the coil 20 for modulating with a stress exerted thereon the measurement light L2 and reference light L3. The third optical path 42 has the third delay line 50, while the coil 20 is disposed between the third delay line 50 and third coupler 41.

The interferometric optical fiber sensor head 3D comprises an optical path (third and fourth subpaths 47, 48) for inputting the measurement light L2 from one end and the reference light L3 from the other end and the coil 20 for modulating with a stress exerted thereon the measurement light L2 and reference light L3. The optical path has the third delay line 50. The coil 20 is disposed between the third delay line 50 and one end of the optical path or between the third delay line 50 and the other end of the optical path.

The foregoing configuration can place the optical path under the same environment and make it less susceptible to external environments. Using the optical path in common can easily achieve a structure which makes optical lengths coincide with each other, thereby readily raising the detection sensitivity.

While embodiments of the present invention are explained in the foregoing, the present invention is not limited to the above-mentioned embodiments. For example, the first optical path 13 is explained as one for inputting the measurement light L2 split from the first coupler 12, but is not limited thereto. The reference light and measurement light may be inputted to the first and second optical paths 13, 14, respectively.

What is claimed is:
1. An interferometric optical fiber sensor system comprising:
   a light source;
   a first coupler optically connected to the light source;

a first optical path optically connected to the first coupler, the first optical path inputting one of measurement light and reference light split from the first coupler, a second optical path optically connected to the first coupler, the second optical path inputting the other of the measurement light and the reference light;

a second coupler that combines the first and second optical paths together;

a measurement unit that measures modulation of the measurement light and the reference light according to light combined by the second coupler; and a modulation unit that modulates with a stress exerted thereon the measurement light and the reference light;

wherein the first optical path has a first delay line, and the second optical path has a second delay line;

wherein the first optical path has an optical length equal to that of the second optical path; and wherein the modulation unit is disposed between the first delay line and the second coupler and between the second delay line and the first coupler.

2. The interferometric optical fiber sensor system of claim 1, wherein the modulation unit includes a coil having the first and second optical paths wound about a common core.

3. The interferometric optical fiber sensor system of claim 1, wherein a delay time caused by the first delay line and a delay time caused by the second delay line are equal to each other.

4. The interferometric optical fiber sensor system of claim 1, wherein the measurement unit removes a ghost signal outputted from the second delay line.

5. The interferometric optical fiber sensor system of claim 1, wherein the first and second couplers are in common;

wherein the first and second optical paths are in common; and wherein the first and second delay lines are in common.

6. The interferometric optical fiber sensor system of claim 2, wherein the first and second optical paths are wound about the core with a gap therebetween; and wherein each of a delay time caused by the first delay line and a delay time caused by the second delay line is longer than a time that the stress propagates through the gap.

7. The interferometric optical fiber sensor system of claim 1, wherein the stress propagates as an acoustic wave.

8. The interferometric optical fiber sensor system of claim 1, further comprising a multicore fiber including a first core constituting at least a part of the first optical path and a second core constituting at least a part of the second optical path.

9. The interferometric optical fiber sensor system of claim 8, further comprising:

a first single-core fiber optically connected to one end of the first core of the multicore fiber;

a second single-core fiber optically connected to one end of the second core of the multicore fiber;

a third single-core fiber optically connected to the other end of the first core of the multicore fiber; and a fourth single-core fiber optically connected to the other end of the second core of the multicore fiber;

wherein the first single-core fiber has the first delay line; and wherein the fourth single-core fiber has the second delay line.

* * * * *